3,069,470
SEPARATION OF TOLUIDINE ISOMERS
Raymond N. Fleck, Whittier, and Carlyle G. Wight, Fullerton, Calif., assignors to Union Oil Company of California, Los Angeles, Calif., a corporation of California
No Drawing. Filed July 21, 1958, Ser. No. 749,630
8 Claims. (Cl. 260—582)

This invention relates to the separation of aromatic amines, and in particular concerns a process for separating the isomers of toluidine by selective adsorption.

There has been increased demand in recent years for the individual isomers of toluidine. These materials are particularly useful as selective solvents and chemical intermediates. The conventional separation of each of the individual toluidine isomers involves a combination of physical and chemical methods requiring extensive equipment, severe processing requirements, and extensive repetition of treating steps to produce at best poor yields of marginally pure products. Since the three toluidine isomers have substantially the same boiling points, fractional distillation is obviously unsatisfactory as a means for resolving the mixture.

We have now found that the isomers of toluidine can be resolved by an adsorptive separation process utilizing a molecular sieve type adsorbent. More particularly, we have found that meta-, ortho-, and para-toluidine can be separated from each other by a process which comprises: contacting the toluidine isomer mixture in either the vapor or liquid phase with a lean Type X molecular sieve adsorbent to obtain a rich adsorbent containing a large proportion of the more readily adsorbed toluidine isomer and an unadsorbed phase enriched in the less readily adsorbed toluidine isomer; separating the rich adsorbent from the non-adsorbed phase; and treating the rich adsorbent to desorb the more readily adsorbed toluidine isomer therefrom, thereby returning the adsorbent to a lean state for re-use in the next succeeding cycle of operation.

Considering now the process of the invention in further detail, it is generally applicable to binary and ternary mixtures of the toluidine isomers. Such isomer mixtures may be obtained from coke oven distillates, petroleum, tar sand, oil shale, bone oils and other natural as well as synthetic sources of aromatic amines. The crude ternary toluidine isomer mixtures obtained from such sources normally contain 40–50 percent ortho-toluidine, 40–50 percent para-toluidine, 0–10 percent meta-toluidine. However, the process of the invention is applicable to mixtures containing any two, or all three, of the isomers in widely varying proportions.

The adsorbent employed in the present process is a Type X molecular sieve having a pore size between about 7 A. and about 12 A., such as is described in British Patent No. 777,233. As a class, molecular sieve adsorbents are crystalline partially dehydrated zeolitic metallo alumino silicates having pores of substantially uniform diameter which may vary from as small as about 3 A. to about 15 A. or greater, depending upon the identity and proportion of the component elements. Of these materials there are two principal types, the so-called "Type A" and "Type X", which differ in their X-ray diffraction patterns, apparent densities, and other characteristics. Both types have been used to separate substances of different molecular size and shape, and it is generally considered that the adsorptive selectivity of molecular sieves is due to their containing uniform pores whose diameter is of molecular magnitude. Thus, the ability of a molecular sieve whose pore diameter is about 5 A. to separate straight-chain paraffins from branched-chain paraffins is considered to be due to the fact that the maximum molecular dimension of the straight-chain paraffins is somewhat less than 5 A., whereas that of the branched-chain paraffins is somewhat greater than 5 A. Consequently, the smaller straight-chain molecules can enter and be held in the pores of the 5 A., sieve, whereas the branched-chain molecules are too large to enter pores of such small size. In the present process, however, the adsorbent cannot operate in such manner since the pore size is greater than the minimum molecular dimension of any of the paraffinic, naphthenic, or aromatic hydrocarbons present in the feed stream. On the other hand, it does not operate as a conventional adsorbent or even as would be expected from the teachings of the aforesaid British Patent No. 777,233. The latter clearly teaches that the Type X molecular sieves preferentially adsorb polar, polarizable and unsaturated molecules and rejects non-polar and saturated molecules. From such teachings it would be expected that there would be essentially no adsorptive preference shown for ortho-toluidine (B.P. 200.7° C.), para-toluidine (B.P. 200.5° C.), and meta-toluidine (B.P. 203.3° C.). As is hereinafter shown, however, we have found that, in the present process, of the three toluidine isomers, meta-toluidine is preferentially adsorbed and para-toluidine is the least readily adsorbed.

As stated, the adsorbents which are employed in accordance with the invention are Type X zeolitic partially dehydrated metallo alumino silicates having pores of a substantially uniform diameter between about 7 A. and about 12 A. Certain naturally occurring minerals can be heated to dehydrate the molecule and obtain an activated zeolitic adsorbent of such type. However, we greatly prefer the synthetic materials which are conveniently prepared by heating stoichiometric quantities of alumina and silica with an excess of sodium hydroxide and thereafter washing out the excess caustic to obtain a Type X zeolitic sodium alumino silicate having the approximate molecular structure of $[6Na_2O \cdot 6Al_2O_3 \cdot 15SiO_2]$ on a water-free basis, and having a uniform pore diameter of about 13 A. The uniform pore diameter of this product can be altered by exchanging part of the sodium cation with other metals. For example, such product can be treated with a concentrated solution of a calcium salt, e.g., calcium chloride, at superatmospheric pressure and at 20° C.–175° C., washed with water to remove excess calcium chloride, and thereafter partially dehydrated by heating to obtain a Type X calcium sodium alumino silicate having a pore diameter of about 10 A. and having an average molecular structure on a water-free basis corresponding to $$[6CaO \cdot 6Al_2O_3 \cdot 15SiO_2]0.9[6Na_2O \cdot 6Al_2O_3 \cdot 15SiO_2]0.1$$

Other divalent cations such as magnesium, strontium, and barium may be employed instead of calcium. Further details regarding the properties and preparation of Type X molecular sieves are to be found in British Patent No. 777,233. While any Type X molecular sieve having a pore diameter between about 7 A. and about 12 A. may be employed in accordance with the invention, it is preferred to use the 10 A. calcium sodium alumino silicate referred to above. This particular product is available commercially under the trade name "Molecular Sieves 10X." The sodium salt described above is also available under the trade name "Molecular Sieves 13X." These commercial materials may contain substantial amounts of inert binder materials.

The optimum particle size of the adsorbent will depend upon the manner in which it is used in the process, i.e., as a fixed compact bed, a fluidized bed, etc., but is usually between about 2 and about 400 mesh, preferably between about 4 and about 30 mesh for fixed and moving compact beds and between about 100 and about 300 mesh for fluidized beds.

The adsorbent is preferably employed in the form of a dense compact fixed or moving bed which is alternately contacted with the feed and then desorbed. In the simplest embodiment of the invention, the adsorbent is employed in the form of a single static bed, in which case the process is only semi-continuous. Preferably, a set of two or more static beds is employed in fixed-bed contacting with appropriate valving so that the feed stream is passed through one or more adsorbent beds while the desorption is carried out in one or more of the other beds in the set. The direction of flow during adsorption and desorption may be either up or down through the adsorbent, but preferably the adsorption is carried out in one flow direction and the desorption in the other. Any of the conventional apparatus employed in static bed fluid-solids contacting may be used. A moving compact bed of adsorbent has a much greater separation efficiency than a fixed compact bed of the same size because of the ability of the former to provide reflux. The moving compact bed is therefore preferable when an extremely high degree of separation is desired or when the feed mixture separation factor is poor.

As previously stated, the crude toluidine isomer mixture is contacted with the adsorbent in either the vapor or liquid phase. The pressure is usually near atmospheric but may be either subatmospheric or superatmospheric. In general the adsorption can be carried out at any temperature below that at which the feed components decompose but is usually effected at a temperature preferably between about 35° C. and about 250° C., and at pressures between about atmospheric and about 1,000 p.s.i.g., preferably between 0 p.s.i.g. and 100 p.s.i.g. The immediate products of the initial adsorption stage are an unadsorbed phase which is rich in the least readily adsorbed toluidine isomer in the feed mixture, and a solid adsorbent containing an adsorbate rich in the most readily adsorbed isomer. The solid and unadsorbed phases are separated, and the latter is passed to storage as the purified isomer product of the process. The rich adsorbent, on the other hand, is treated to desorb the isomer adsorbent therefrom and to return it to a lean state for reuse. According to one mode of operation, such treatment merely comprises subjecting the rich adsorbent to an elevated temperature and/or reduced pressure. The use of elevated temperatures may also be combined with the use of a stripping gas in the known manner.

In accordance with a preferred mode of operation the rich adsorbent is treated with a suitable displacement exchange fluid at approximately the same temperature as that employed in the initial adsorption stage. The displacement exchange fluid may be any material which is inert with respect to the adsorption of the feed mixture, is adsorbable by the adsorbent, and is readily separated from the components of the feed mixture by distillation, absorption, or other conventional means. Preferably the displacement exchange fluid is one which has a boiling point substantially outside the boiling range of the feed mixture and has an adsorbability substantially the same as that of the adsorbed components of the feed mixture. Preferred displacement exchange fluids are aniline and amines boiling sufficiently below the feed mixture to make them easily separable from both the adsorbed and unadsorbed phases by distillation such as hexylamine, heptylamine, and octylamine. Other materials which may be employed include pyridine, methylpyridines, dimethylpyridines, quinoline, isoquinoline, morpholine, N-methyl morpholine, N-ethyl morpholine, and the like.

The following experimental examples specifically illustrate the practice of the invention.

*Example I*

A mixture of ortho-toluidine (49 percent by weight) and para-toluidine (51 percent by weight) is dissolved in iso-octane. The toluidine isomer solution is then contacted with a powdered "Molecular Sieves 10X" (calcium sodium alumino silicate) adsorbent under refluxing conditions (about 99° C.) at atmospheric pressure. The contacting is continued for 60 minutes, after which the rich solid adsorbent is separated from the unadsorbed phase. The latter analyzes 46 percent by weight ortho-toluidine and 54 percent by weight para-toluidine. The rich adsorbent is then quinoline stripped, yielding an adsorbate enriched in ortho-toluidine.

*Example II*

A mixture of toluidine isomers comprising 49 percent by weight ortho-toluidine and 51 percent by weight para-toluidine is circulated for a period of 60 minutes through a lean "Molecular Sieves 10X" adsorbent bed at about 220° C. and one atmosphere pressure. The unadsorbed phase contains 46 percent by weight ortho-toluidine and 54 percent by weight para-toluidine. The rich adsorbent is then stripped with aniline at about 220° C. and atmospheric pressure, yielding an adsorbate enriched in ortho-toluidine.

*Example III*

A mixture of 50 percent by weight meta-toluidine and 50 percent by weight ortho-toluidine is dissolved in iso-octane. The toluidine isomer solution is then contacted for a period of 60 minutes with a powdered "Molecular Sieves 10X" (calcium sodium alumino silicate) adsorbent under refluxing conditions as in Example I.

*Example IV*

In another experiment, the unadsorbed phase of Example I is reprocessed in the same manner as the original feed mixture and a correspondingly higher para-toluidine purity is obtained. The final purity of the para-toluidine rich unadsorbed phase is about 99 percent after 15 successive stages of treatment.

*Example V*

Another experiment, conducted in the same manner and with the same feed as Example II, except that a pressure of 40 p.s.i.g. and a temperature of 250° C. is maintained during adsorption and stripping, yields essentially the same separation of ortho- and para-toluidine as found in Example II.

*Example VI*

In another run, a Type X strontium sodium alumino silicate is substituted for the "Molecular Sieves 10X" (zeolitic calcium sodium alumino silicate) in an experiment conducted in the same manner and with the same feed as Example I. The analysis of the unadsorbed phase is essentially the same as found in Example I.

Although the deactivation of the adsorbent is gradual, some deactivation may eventually occur. It is within the scope of this invention to reactivate the silicate adsorbent by high temperature contacting with a hot reactivating gas such as flue gas, air, etc.

As will be apparent, the process of the invention essentially comprises solids-fluid contacting operations, and any of the various techniques and equipment conventionally applied to such type of operation may be adapted to the practice of the invention without departing from the scope thereof. Thus, while it is often preferred to maintain the adsorbent in the form of a moving bed, i.e., as a solids-fluid contacting operation in which a compact bed of the adsorbent is passed successively through adsorption and desorption zones where it is concurrently or counter-currently contacted with the feed stream and the displacement exchange fluid, respectively, the process is, nevertheless, operable in the form of a fixed compact bed. Also, the solids-fluid contacting operation may be carried out employing fluidized techniques whereby the adsorbent is employed in relatively small particle size and is suspended by the flow of the fluid with which it is contacted.

Other modifications and adaptations which would occur to one skilled in this particular art are to be included in the spirit and scope of this invention as defined by the following claims.

We claim:

1. A process for separating a more readily adsorbed toluidine isomer from a mixture consisting essentially of toluidine isomers which comprises: (1) contacting said mixture with a lean granular adsorbent consisting essentially of a partially dehydrated crystalline Type X metallo alumino silicate having pores of substantially uniform diameter between about 7 A. and about 12 A. whereby there is obtained a rich adsorbent containing the more readily adsorbed toluidine isomer in greater concentration than in said mixture and an unadsorbed raffinate product; (2) separating said raffinate product from said rich adsorbent; and (3) treating said rich adsorbent to recover the more readily adsorbed toluidine isomer therefrom.

2. A process as defined by claim 1 wherein, in step (3), the rich adsorbent is contacted with a displacement exchange fluid to obtain an extract product comprising desorbed more readily adsorbed toluidine isomer and said displacement exchange fluid, and said extract product is distilled to separate said displacement exchange fluid therefrom, said displacement exchange fluid being an amine boiling sufficiently below the toluidine isomers to be readily separable therefrom by distillation.

3. A process according to claim 1 wherein said metallo alumino silicate is a divalent metal sodium alumino silicate.

4. A process for separating ortho-toluidine from the mixture comprising ortho-toluidine and para-toluidine, which comprises: (1) contacting said mixture with a lean granular adsorbent consisting essentially of a partially dehydrated crystalline Type X zeolitic calcium sodium alumino silicate having substantially uniform diameter pores of about 10 A., said contacting being effected at a temperature between about 35° C. and about 250° C. and at a pressure between about 0 p.s.i.g. and about 100 p.s.i.g., whereby there is obtained a rich adsorbent containing adsorbed ortho-toluidine in greater concentration than in said mixture and an unadsorbed raffinate product which is rich in para-toluidine; (2) separating said raffinate product from said rich adsorbent; and (3) treating said rich adsorbent to desorb the said ortho-toluidine therefrom.

5. A process for separating metal-toluidine from the mixture comprising metal-toluidine and para-toluidine, which comprises: (1) contacting said mixture with a lean granular adsorbent consisting essentially of a partially dehydrated crystalline Type X zeolitic calcium sodium alumino silicate having substantially uniform diameter pores of about 10 A., said contacting being effected at a temperature between about 35° C. and about 250° C., and at a pressure between about 0 p.s.i.g. and about 100 p.s.i.g., whereby there is obtained a rich adsorbent containing adsorbed meta-toluidine in greater concentration than in said mixture and an unadsorbed raffinate product which is rich in para-toluidine; (2) separating said raffinate product from said rich adsorbent; and (3) treating said rich adsorbent to desorb the said metal-toluidine therefrom.

6. A process for separating meta-toluidine from the mixture comprising meta-toluidine and ortho-toluidine, which comprises: (1) contacting said mixture with a lean granular adsorbent consisting essentially of a partially dehydrated crystalline Type X zeolitic calcium sodium alumino silicate having substantially uniform diameter pores of about 10 A., said contacting being effected at a temperature between about 35° C. and about 250° C., and at a pressure between about 0 p.s.i.g. and about 100 p.s.i.g., whereby there is obtained a rich adsorbent containing adsorbed meta-toluidine in greater concentration than in said mixture and an unadsorbed raffinate product which is rich in ortho-toluidine; (2) separating said raffinate product from said rich adsorbent; and (3) treating said rich adsorbent to desorb the said meta-toluidine therefrom.

7. A process for separating from each other two toluidine isomers in admixture which comprises: (1) contacting said mixture in the vapor phase with a lean granular adsorbent consisting essentially of a partially dehydrated crystalline Type X zeolitic calcium sodium alumino silicate having substantially uniform diameter pores of about 10 A., said contacting being effected at a pressure between about 0 p.s.i.g. and about 100 p.s.i.g., whereby there is obtained a rich adsorbent containing the more readily adsorbed toluidine isomer in greater concentration than in said mixture and an unadsorbed raffinate product; (2) separating said raffinate product from said rich adsorbent; (3) contacting said rich adsorbent with aniline to obtain an extract product comprising the more readily adsorbed toluidine isomer and aniline, and (4) treating said extract product to separate aniline therefrom.

8. A process for separating a more readily adsorbed toluidine isomer from a fluid mixture consisting essentially of toluidine isomers which comprises: contacting said fluid mixture with a lean solid granular adsorbent consisting essentially of a partially dehydrated crystalline metallo alumino silicate having pores of substantially uniform diameter between about 7 A. and about 12 A. whereby there is obtained a rich solid adsorbent and an unadsorbed fluid raffinate product; and separating said unadsorbed fluid raffinate product from said rich solid adsorbent, said unadsorbed fluid raffinate product having a lower concentration of said more readily adsorbed toluidine isomer than said fluid mixture.

References Cited in the file of this patent

UNITED STATES PATENTS 2,306,610 Barrer _____ Dec. 29, 1942

FOREIGN PATENTS 777,233 Great Britain _____ June 19, 1957

OTHER REFERENCES

Barrer: Chemistry Society Quarterly Review, vol. 3: pages 298–304 (1949).